(12) United States Patent
Ogawa (10) Patent No.: US 6,477,296 B1
(45) Date of Patent: Nov. 5, 2002

(54) OPTICAL WAVEGUIDE DEVICE, OPTICAL TRANSMITTING AND RECEIVING DEVICE, METHOD OF MANUFACTURING OPTICAL WAVEGUIDE DEVICE AND METHOD OF MANUFACTURING OPTICAL TRANSMITTING AND RECEIVING DEVICE

(75) Inventor: Tsuyoshi Ogawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/496,655

(22) Filed: Feb. 3, 2000

(30) Foreign Application Priority Data

Feb. 5, 1999 (JP) .......................................... 11-029258

(51) Int. Cl.[7] ................................................. G02B 6/26
(52) U.S. Cl. ...................................................... 385/31
(58) Field of Search ........................... 385/31, 39, 123, 385/129, 130, 132

(56) References Cited

U.S. PATENT DOCUMENTS 5,499,309 A * 3/1996 Kozuka et al. ............... 385/38
5,999,670 A * 12/1999 Yoshimura et al. ......... 385/123

* cited by examiner

*Primary Examiner*—Akm E. Ullah
*Assistant Examiner*—Sarah U Song
(74) *Attorney, Agent, or Firm*—Sonnenschein, Nath & Rosenthal (57) ABSTRACT

This invention provides optical waveguide, transmitting, and receiving devices and methods that enables bidirectional communication. Formed on an optical waveguide near a first end (A-side) to cross a direction of light propagation may be a trench-shaped space having a first boundary surface and a second boundary surface. The first boundary surface may internally reflect the light propagating through the optical waveguide from a second end (B-side) so that the reflected light may exit outward through a side surface of the optical waveguide. The transmitting light entering through an end surface on the A-side of the optical waveguide may pass through the second boundary surface and enter through the first boundary surface. In the optical waveguide formed on a substrate, the optical signal may be bidirectionally transmitted and received by a relatively simple constitution to achieve an increase in density of optical wiring.

27 Claims, 7 Drawing Sheets

OPTICAL WAVEGUIDE DEVICE, OPTICAL TRANSMITTING AND RECEIVING DEVICE, METHOD OF MANUFACTURING OPTICAL WAVEGUIDE DEVICE AND METHOD OF MANUFACTURING OPTICAL TRANSMITTING AND RECEIVING DEVICE

RELATED APPLICATION DATA

The present application claims priority to Japanese Application No. P11-029258 filed Feb. 5, 1999 which application is incorporated herein by reference to the extent permitted by law.

BACKGROUND OF THE INVENTION

1. Field of the Invention

The invention relates to an optical waveguide device including an optical waveguide capable of propagating a light, an optical transmitting and receiving device, a method of manufacturing an optical waveguide device and a method of manufacturing an optical transmitting and receiving device.

2. Description of the Related Art

In the field of an integrated circuit (IC), a large scale integration (LSI) or the like, the technological advance improves an operating speed and a scale of integration, thereby rapidly promoting an enhancement in performance of a microprocessor and an increase in a capacity of a memory chip. However, the increase in a transmission rate of an electric signal and the increase in density of signal wiring are bottlenecks for an improvement in the performance of these electronic devices. Moreover, a problem of signal delay in electrical wiring arises. Furthermore, a provision for EMI/EMC (Electro-Magnetic Interference/Electro-Magnetic Compatibility) is indispensable for achieving the increase in the transmission rate of the electric signal and the increase in the density of the signal wiring. Attention is paid to an optical interconnection (optical wiring) as means for eliminating the bottlenecks in these wirings.

This optical interconnection is considered to be applicable to various situations such as the interconnection between devices, between in-device boards or between in-board chips. An optical transmission communication system, in which an optical waveguide formed on a substrate is used as a transmission line, is considered to be suitable for a transmission over relatively short distances such as the distance between the chips, for example. For the optical transmission communication system using such an optical waveguide, an important problem is to establish a process of making the optical waveguide.

Requirements for such an optical waveguide are a low optical loss and easiness in making. Optical waveguides for satisfying these requirements include a low-loss optical waveguide using a quartz base material, for example. As has been proved by an optical fiber, quartz is excellent in light transmittance. Thus, the loss can be reduced to 0.1 dB/cm or less when the optical waveguide is made of quartz. However, the use of quartz has problems such as a long time required to make the optical waveguide, a high temperature (800° C. or higher) at the time of the making, a difficulty in increasing an area and a high cost. It is considered that a high polymeric material such as polymethyl methacrylate (PMMA) or polyimide is used as the material for solving these problems and making it possible to make the optical waveguide by a low-temperature process.

Taking into consideration the increase in the density of an optical transmission using the optical waveguide, it is desirable t hat an optical signal is bidirectionally propagated through the optical waveguide. However, the system for intending the optical signal to bidirectionally propagate has various problems to be solved, such as the form of an entry of the light from a light emitting device into the optical waveguide, the form of an exit of the light from the optical waveguide to a photodetector, an arrangement of the light emitting device and the photodetector with respect to the optical waveguide, or crosstalk between the signals bidirectionally propagated.

The invention is designed to overcome the foregoing problems. It is an object of the invention to provide an optical waveguide device and an optical transmitting and receiving device which enable bidirectional communication by allowing the optical signal to bidirectionally propagate by using the optical waveguide formed on the substrate and used as the optical wiring, a method of manufacturing an optical waveguide device and a method of manufacturing an optical transmitting and receiving device.

SUMMARY OF THE INVENTION

An optical waveguide device of the invention comprises an optical waveguide formed on a substrate and enabling a light to bidirectionally propagate therethrough; and a trench-shaped space formed in the optical waveguide near at least one end of the optical waveguide so as to cross a direction of light propagation, the trench-shaped space being capable of switching the light propagating through the optical waveguide. The optical waveguide can comprise a high polymeric material. Moreover, the substrate can comprise an inorganic material containing at least one of silicon, quartz, glass and ceramics or an organic material.

An optical transmitting and receiving device of the invention comprises an optical waveguide formed on a substrate and enabling a light to bidirectionally propagate therethrough; a trench-shaped space formed in the optical waveguide near at least one end of the optical waveguide so as to cross the direction of light propagation, the trench-shaped space being capable of switching the light propagating through the optical waveguide; a photodetector for receiving a coming light switched by the trench-shaped space; and a light emitting device for emitting a transmitting light toward the trench-shaped space.

In the optical waveguide device or the optical transmitting and receiving device of the invention, the optical waveguide can include a core which the light propagates through; and a cladding formed so as to surround the core. In this case, it is desirable that the trench-shaped space is formed so as to cross at least the core.

Moreover, in the optical waveguide device or the optical transmitting and receiving device of the invention, the trench-shaped space can have a first boundary surface capable of internally reflecting a coming light propagating through the optical waveguide, thereby guiding the coming light out of the optical waveguide; and a second boundary surface capable of passing therethrough a transmitting light traveling in the direction opposite to the direction of propagation of the coming light, thereby guiding the transmitting light into the optical waveguide. Preferably, when n denotes a refractive index of a material constituting a principal part of the optical waveguide, an angle $\theta 1(°)$ of the first boundary surface to the direction of light propagation satisfies $\theta 1 < 90 - \sin^{-1}(1/n)$, and an angle $\theta 2(°)$ of the second boundary surface to the direction of light propagation satisfies $\theta 2 > 90 - \sin^{-1}(1/n)$.

Moreover, in the optical waveguide device or the optical transmitting and receiving device of the invention, at least one end of the optical waveguide can form an end surface which is substantially perpendicular to the direction of light propagation and which is capable of passing therethrough the externally incoming transmitting light in substantially the same direction as the incoming direction, and the transmitting light entering through the end surface passes the second boundary surface, the trench-shaped space and the first boundary surface in sequence so that the transmitting light is guided into the optical waveguide.

Moreover, in the optical waveguide device or the optical transmitting and receiving device of the invention, at least one end of the optical waveguide may form an end surface which forms a predetermined angle with the direction of light propagation so as to cross the direction of light propagation and which is capable of internally reflecting the transmitting light entering through an upper surface or a side surface of the optical waveguide, and the transmitting light reflected by the end surface passes the second boundary surface, the trench-shaped space and the first boundary surface in sequence so that the transmitting light is guided into the optical waveguide. In this case, preferably, when n denotes the refractive index of the material constituting the principal part of the optical waveguide, an angle $\theta 3(°)$ of the end surface to the direction of light propagation satisfies $\theta 3 > \sin^{-1}(1/n)$.

A method of manufacturing an optical waveguide device of the invention comprises the steps of forming on a substrate an optical waveguide enabling a light to bidirectionally propagate therethrough; and forming a trench-shaped space in the optical waveguide near at least one end of the optical waveguide so as to cross the direction of light propagation, the trench-shaped space having a first boundary surface and a second boundary surface, the first boundary surface being capable of internally reflecting a coming light propagating through the optical waveguide and thereby guiding outward the coming light through the upper surface or the side surface of the optical waveguide, the second boundary surface being capable of passing therethrough a transmitting light traveling in the direction opposite to the direction of propagation of the coming light and thereby guiding the transmitting light into the optical waveguide through the first boundary surface.

A method of manufacturing an optical transmitting and receiving device of the invention comprises the steps of forming on a substrate an optical waveguide enabling a light to bidirectionally propagate therethrough; forming a trench-shaped space in the optical waveguide near at least one end of the optical waveguide so as to cross the direction of light propagation, the trench-shaped space having a first boundary surface and a second boundary surface, the first boundary surface being capable of internally reflecting a coming light propagating through the optical waveguide and thereby guiding outward the coming light through the upper surface or the side surface of the optical waveguide, the second boundary surface being capable of passing therethrough a transmitting light traveling in the direction opposite to the direction of propagation of the coming light and thereby guiding the transmitting light to the optical waveguide through the first boundary surface; forming a photodetector for receiving the coming light reflected by the first boundary surface, on the upper surface or the side surface of the optical waveguide near the first boundary surface; and forming near the end surface a light emitting device for emitting the transmitting light toward the end surface.

In the optical waveguide device of the invention, the light propagating through the optical waveguide is switched by the trench-shaped space which is formed in the optical waveguide near at least one end of the optical waveguide formed on the substrate so as to cross the direction of light propagation. Herein, the phrase "the light is switched" means that the light propagating through the optical waveguide is guided to routes differing in accordance with the direction of propagation of the light.

In the optical transmitting and receiving device of the invention, the light propagating through the optical waveguide is switched by the trench-shaped space which is formed in the optical waveguide near at least one end of the optical waveguide formed on the substrate so as to cross the direction of light propagation. The coming light switched by the trench-shaped space is received by the photodetector, while the transmitting light is emitted from the light emitting device toward the trench-shaped space.

Other and further objects, features and advantages of the invention will appear more fully from the following description.

DETAILED DESCRIPTION OF THE PREFERRED EMBODIMENTS

Embodiments of the invention will be described in detail below with reference to the accompanying drawings.

[First embodiment]

Figure 1:
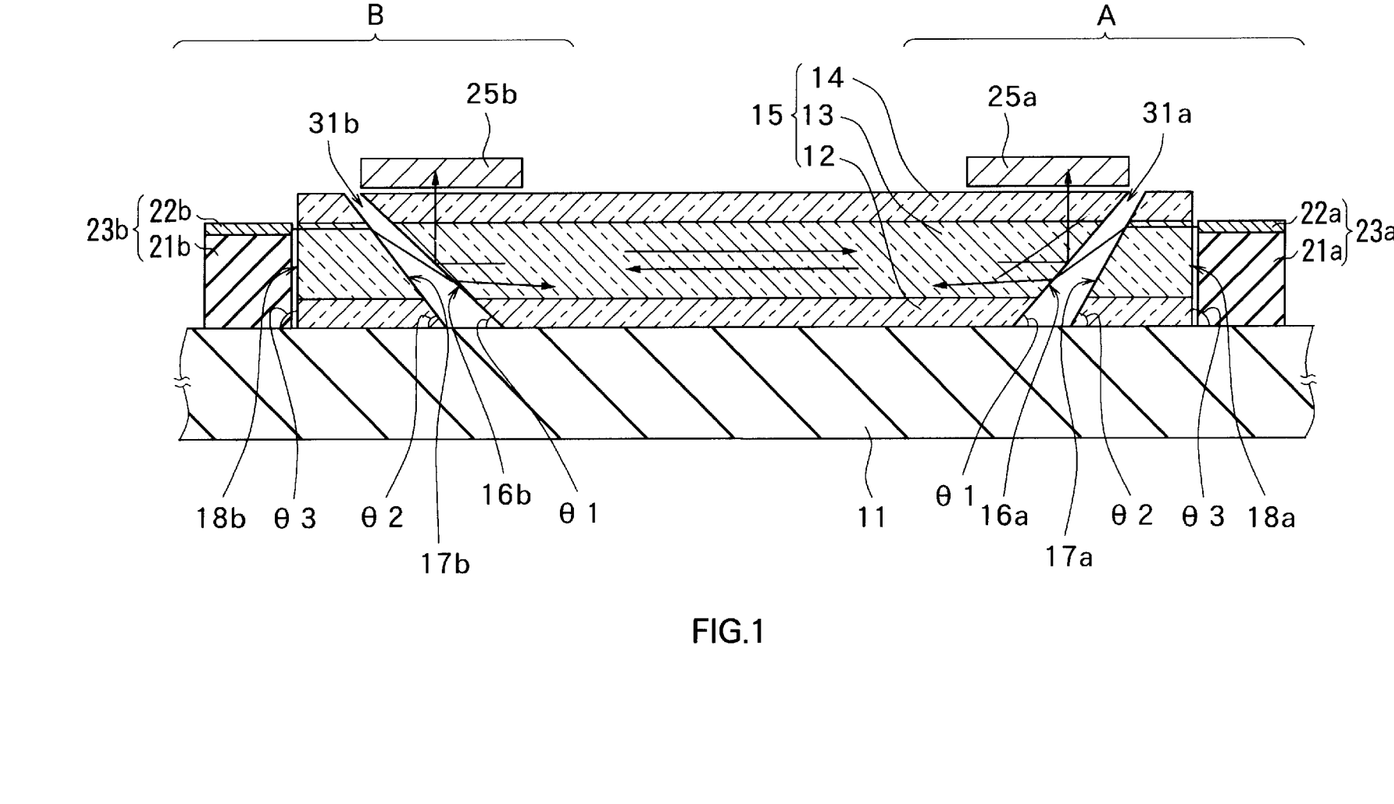
FIG. 1 is a cross sectional view of an optical transmitting and receiving device according to one embodiment of the invention, showing a sectional structure taken along the direction of light propagation.
Figure 2:
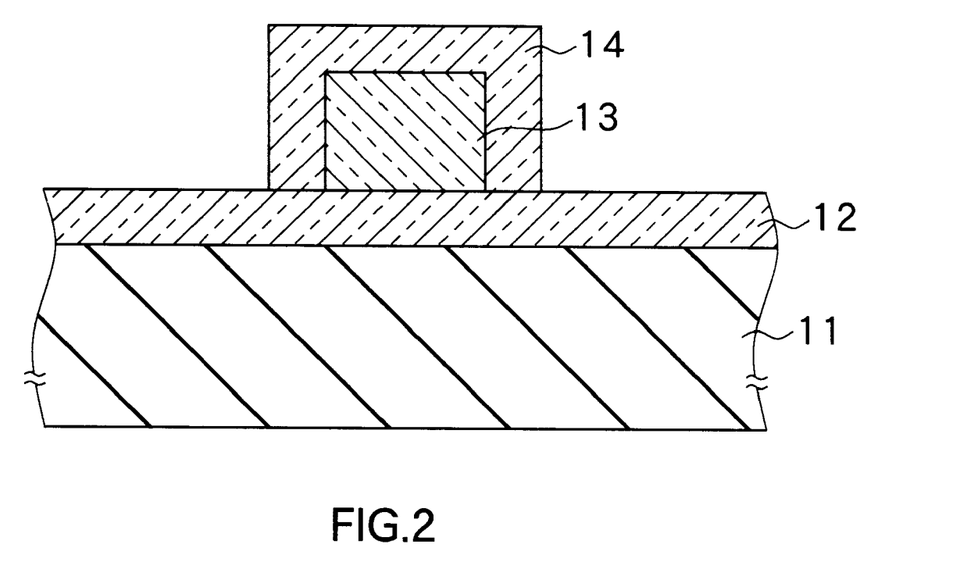
FIG. 2 is a cross sectional view of the optical transmitting and receiving device according to one embodiment of the invention, showing the sectional structure taken along the direction perpendicular to the direction of light propagation.
Figure 3:
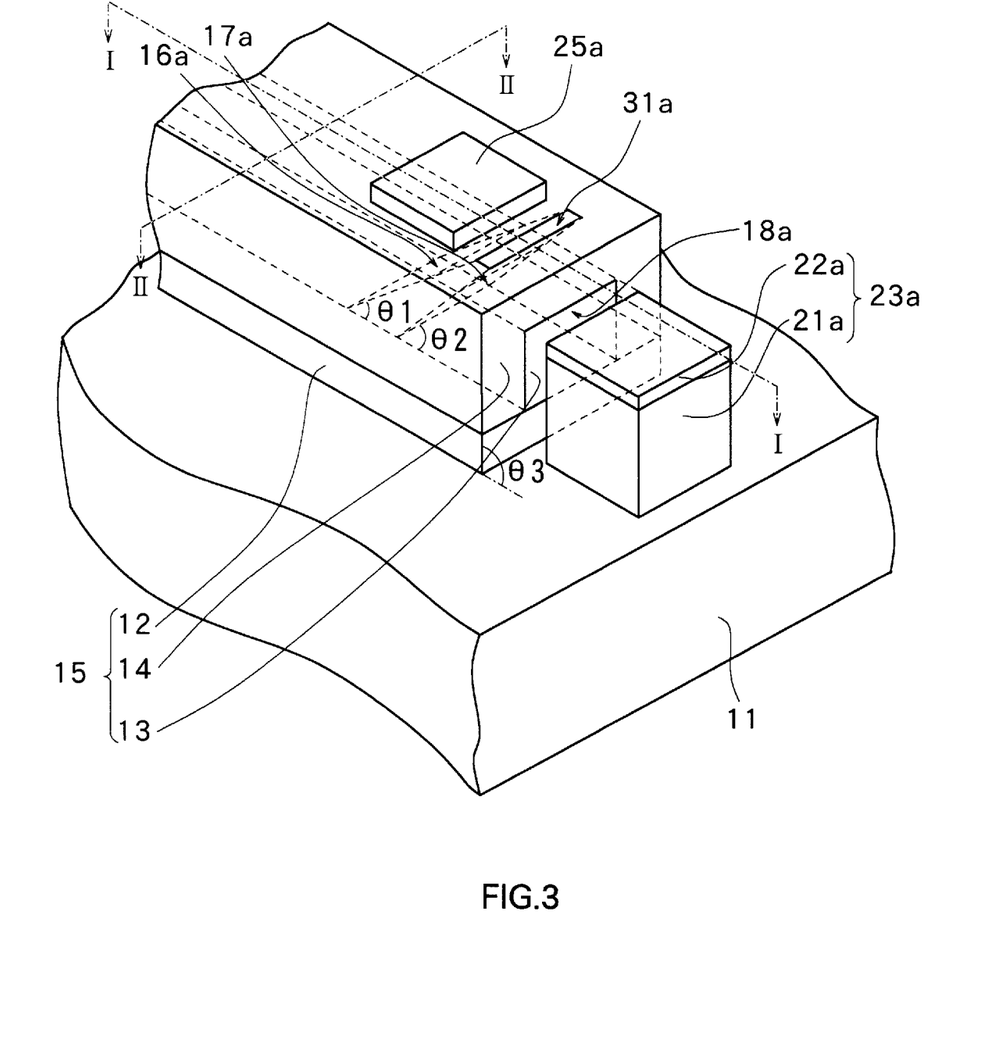
FIG. 3 is a perspective view of an external constitution of the optical transmitting and receiving device according to one embodiment of the invention.

FIGS. 1 to 3 show a principal part of a constitution of an optical transmitting and receiving device according to one embodiment of the invention applied to a bidirectional optical transmission system. FIG. 3 is a perspective view of an external constitution of the principal part of the optical transmitting and receiving device. FIG. 1 shows a cross section taken along line I—I of FIG. 3. FIG. 2 shows a cross section taken along line II—II of FIG. 3. Since an optical waveguide device according to the embodiment of the invention and a method of manufacturing the same are embodied by the optical transmitting and receiving device according to the embodiment and a method of manufacturing the same, the former device and method will be described in conjunction with the latter device and method.

As shown in these drawings, the optical transmitting and receiving device of this embodiment comprises a substrate 11, an optical waveguide formed on the substrate 11, light emitting devices 23a and 23b arranged on the substrate 11 and facing ends 18a and 18b of the optical waveguide 15, respectively, and photodetectors 25a and 25b arranged on an upper surface (a side surface) of the optical waveguide 15 near the ends of the optical waveguide 15, respectively. The substrate 11 is typically composed of an inorganic material such as silicon, quartz or glass, and the substrate flattened with high precision specifically for an optical circuit is used as the substrate 11. Besides, the substrate 11 may be an electrical wiring substrate having relatively great roughness because of electrical wiring formed thereon. Furthermore, such an electrical wiring substrate may be, for example, the substrate made of an inorganic material such as ceramics or the substrate made of a glass-epoxy-family organic material. The optical waveguide 15 corresponds to "an optical waveguide" of the invention, and the ends 18a and 18b correspond to "end surfaces" of the invention.

The optical waveguide 15 has a core 13, and claddings 12 and 14 which are formed so that the upper, lower, left and right sides of the core 13 may be surrounded by the claddings 12 and 14, each of which has a refractive index lower than the refractive index of the core 13. The core 13 is made of a high polymeric material described below, and the claddings 12 and 14 are made of the same high polymeric material. The claddings 12 and 14 correspond to "claddings" of the invention, and the core 13 corresponds to "a core" of the invention.

An angle θ3 between each of the ends 18a and 18b of the optical waveguide 15 and the surface of the substrate 11 is about 90° in this embodiment. The light emitting device 23a is arranged on the substrate 11 on one transmitting and receiving end side (hereinafter referred to as an A side) of the optical waveguide 15 so as to face the end 18a. The light emitting device 23b is arranged on the substrate 11 on the other transmitting and receiving end side (hereinafter referred to as a B side) of the optical waveguide 15 so as to face the end 18b. Only the A side is shown in FIG. 3. The light emitting device 23a has a base layer 21a formed on the substrate 11 and a light emitting layer 22a formed on the base layer 21a. Similarly, the light emitting device 23b has a base layer 21b and a light emitting layer 22b. An edge emitting type light emitting device such as an edge emitting type semiconductor laser, for example, can be used as the light emitting devices 23a and 23b. In this case, the light exiting through the end of the light emitting layer 22a of the light emitting device 23a enters through the end 18a substantially perpendicularly to the end 18a. On the other hand, the light exiting through the end of the light emitting layer 22b of the light emitting device 23b enters through the end 18b substantially perpendicularly to the end 18b.

The optical waveguide 15 has trench-shaped spaces 31a and 31b in the A and B sides thereof, respectively. The trench-shaped spaces 31a and 31b are made so as to cross the direction in which the light propagates through the optical waveguide 15 (a longitudinal direction of the optical waveguide 15). More specifically, as shown in FIGS. 1 and 3, the trench-shaped space 31a is made so as to diagonally cross three parts, i.e., the cladding 14 on the core 13, the core 13 and the cladding 12 under the core 13, in this order. Thus, the trench-shaped space 31a has only to cross at least the core 13 and does not have to cross the claddings 12 and 14. However, the trench-shaped space 31a is increased in size in the longitudinal direction of the trench-shaped space 31a (the direction perpendicular to the surface of a sheet in FIG. 1) so that the trench-shaped space 31a may cross not only the three parts, i.e., the cladding 14 on the core 13, the core 13 and the cladding 12 under the core 13 but also the claddings 12 and 14 on both the sides of the core 13, whereby the optical waveguide 15 may be completely separated by the trench-shaped space 31a. In this embodiment, it is assumed that the trench-shaped space 31a is filled with an external medium (e.g., the air) of the optical waveguide 15.

The trench-shaped space 31a is delimited mainly by a boundary surface 16a and a boundary surface 17a. The boundary surface 16a forms an angle θ1 with the surface of the substrate 11, and the boundary surface 17a forms an angle θ2 with the surface of the substrate 11, where θ2>θ1. The angle θ1 is set to such an angle that all the coming lights propagating through the optical waveguide 15 along the direction of light propagation from the left side (the B side) in FIG. 1 can be internally reflected by the first boundary surface 16a and can exit outward through the upper surface of the optical waveguide 15. Moreover, the angle θ2 is set to such an angle that the transmitting light entering through the end 18a and propagating in the direction (the direction from right to left in FIG. 1) opposite to the direction of propagation of the coming light (the direction from left to right in FIG. 1) can pass through the second boundary surface 17a and can enter through the first boundary surface 16a. The angles θ1 and θ2 will be further described below. Since the structure and shape of the trench-shaped space 31b are the same as those of the trench-shaped space 31a, the description thereof is omitted. The trench-shaped space 31a or 31b corresponds to "a trench-shaped space" of the invention. The boundary surface 16a corresponds to "a first boundary surface" of the invention, and the boundary surface 17a corresponds to "a second boundary surface" of the invention.

The photodetectors 25a and 25b are arranged on the optical waveguide 15 on the A and B sides of the optical waveguide 15, respectively. For example, a surface photodetection type photodetector such as a Pin type photodetector or an MSM (Metal-Schottky-Metal) type photodetector can be used as the photodetectors 25a and 25b.

Next, a function of the optical transmitting and receiving device having the above constitution will be described with reference to FIG. 1. An optical principle of transmission and reception on the A side, one transmitting and receiving end will be described. Since the principle of the transmission and reception on the other transmitting and receiving end (the B side) is the same as that on one transmitting and receiving end (the A side), the description thereof is omitted.

First, the principle of the transmission will be described. The transmitting light, which exits through the end of the light emitting layer 22a of the light emitting device 23a substantially parallel to the substrate 11, enters through the end 18a that is the end of the optical waveguide 15, as shown in FIG. 1. The end 18a is substantially perpendicular to the direction of light propagation (the longitudinal direction of the optical waveguide 15) as described above. Thus, the transmitting light entering through the end 18a travels in straight lines as it is, and the light reaches the boundary surface 17a of the trench-shaped space 31a close to the light emitting device 23a. The boundary surface 17a is formed so as to form the angle θ2 at which the incident transmitting light is not totally reflected, with respect to the direction of light propagation (equal to the direction of the surface of the substrate 11). That is, the angle θ2 is such an angle that an incident angle of the transmitting light incident on the boundary surface 17a does not exceed a critical angle. More specifically, the angle θ2 (in units of degrees) depends on a refractive index n of the material constituting the core 13 of the optical waveguide 15, and the angle θ2 is set in accordance with Snell's law so as to satisfy the following expression (1).

$$\theta 2 > 90 - \sin^{-1}(1/n) \quad (1)$$

As long as the expression (1) is satisfied, the transmitting light from the light emitting device 23a is not totally reflected by the boundary surface 17a but is refracted by the boundary surface 17a in accordance with Snell's law and passes through the boundary surface 17a. For example, assuming that the refractive index n of the core 13 is 1.5, θ2>48.2° is obtained from the expression (1). That is, in this case, if the angle θ2 is 50° or more for example, the transmitting light can sufficiently pass through the boundary surface 17a and thus an optical switching operation is ensured during the transmission.

The transmitting light, which has passed through the boundary surface 17a, travels through the trench-shaped space 31a and reaches the boundary surface 16a of the trench-shaped space 31a. The transmitting light is refracted by the boundary surface 16a in accordance with Snell's law, then the light travels into the core 13 of the optical waveguide 15, and further the light travels through the core 13 toward the B side. The direction in which the transmitting light travels from the boundary surface 16a into the core 13 forms a small angle with the direction of light propagation. However, as long as the optical waveguide 15 has such a numerical aperture (NA) as may be capable of propagating the transmitting light and may be permissible, the transmitting light can propagate through the optical waveguide 15 at sufficient power. The greater a difference between the refractive index n of the core 13 and the refractive index of each of the claddings 12 and 14, the higher the numerical aperture of the optical waveguide 15 and thus the higher an efficiency of propagation of the transmitting light.

Next, the principle of the reception will be described. As described above, the angle θ1 of the boundary surface 16a of the trench-shaped space 31a close to the photodetector 25a to the direction of light propagation is such an angle that the light propagating through the optical waveguide from the B side is totally reflected by the boundary surface 16a. In other words, the angle θ1 is such an angle that the incident angle of the coming light incident on the second boundary surface is equal to or more than the critical angle. More specifically, the angle θ1 (in units of degrees) depends on the refractive index n of the material constituting the core 13 of the optical waveguide 15, and the angle θ1 is set in accordance with Snell's law so as to satisfy the following expression (2).

$$\theta 1 < 90 - \sin^{-1}(1/n) \quad (2)$$

As long as the expression (2) is satisfied, the coming light propagating through the core 13 of the optical waveguide 15 from the B side does not pass through the boundary surface 16a but is totally reflected by the boundary surface 16a and received by the photodetector 25a arranged on the upper surface of the optical waveguide 15. For example, assuming that the refractive index n of the core 13 of the optical waveguide 15 is 1.5, 1<48.2° is obtained. That is, in this case, if the angle θ1 is 45° or less for example, the light from the B side is totally reflected by the boundary surface 16a and enters into the photodetector 25a. Therefore, the optical switching operation is ensured during the reception, and an efficiency of photo-detection is maximized.

For example, assuming that the refractive index n of the material of the core 13 is 1.5, that θ1 is 45° and that θ2 is 50°, the angle, at which the transmitting light from the light emitting device 23a reenters into the optical waveguide 15 through the boundary surfaces 17a and 16a, is an angle of about 4° to the direction of light propagation. Thus, the optical waveguide having a typical NA (e.g., NA=about 0.2 to about 0.3) would be sufficiently capable of optical coupling. A width of the trench-shaped space 31a, namely, a distance between the boundary surfaces 16a and 17a may be minimized as long as these two boundary surfaces are such that they have no optical effect on each other. Specifically, the width such that the boundary surfaces have no optical effect on each other means the width equal to or more than a wavelength order (e.g., a few micrometers) of the light. In this case, a multi-mode optical waveguide having a core diameter of tens of micrometers to hundreds of micrometers, for example, permits sufficient optical coupling. On the other hand, the coming light from the B side is totally reflected by the boundary surface 16a and received by the photodetector 25a.

As described above, according to the optical transmitting and receiving device of this embodiment, the trench-shaped space 31a having the boundary surfaces 16a and 17a is located in the optical waveguide near one end of the optical waveguide 15 so that the trench-shaped space 31a may cross the direction of light propagation. Thus, the coming light propagating through the optical waveguide 15 from the B side is internally reflected by the boundary surface 16a and exits outward through the upper surface of the optical waveguide 15, and the transmitting light entering through the end 18a on the A side of the optical waveguide 15 passes through the boundary surface 17a and enters through the boundary surface 16a. Thus, a single optical waveguide formed on the substrate can bidirectionally switch an optical signal by a relatively simple constitution. Therefore, a bidirectional optical transmission and reception system can achieve a high-density optical transmission by low-density optical wiring.

Next, the method of manufacturing the optical transmitting and receiving device according to this embodiment will be described with reference to FIGS. 4 to 9.

Figure 4:
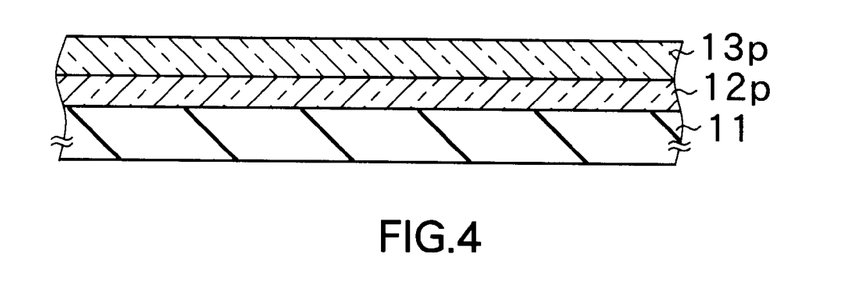
FIG. 4 is a cross sectional view of one process of a method of manufacturing the optical transmitting and receiving device according to one embodiment of the invention.
Figure 5:
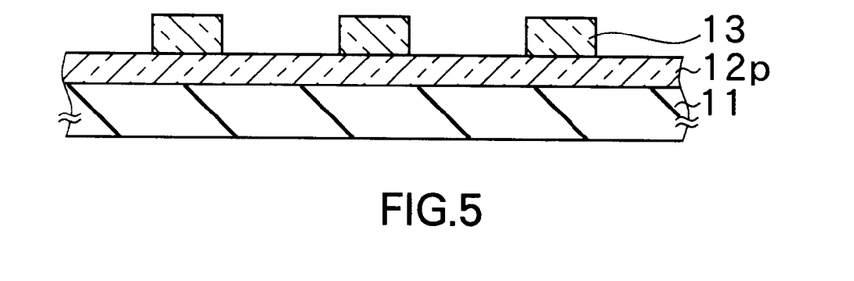
FIG. 5 is a cross sectional view of the process following the process of FIG. 4.
Figure 6:
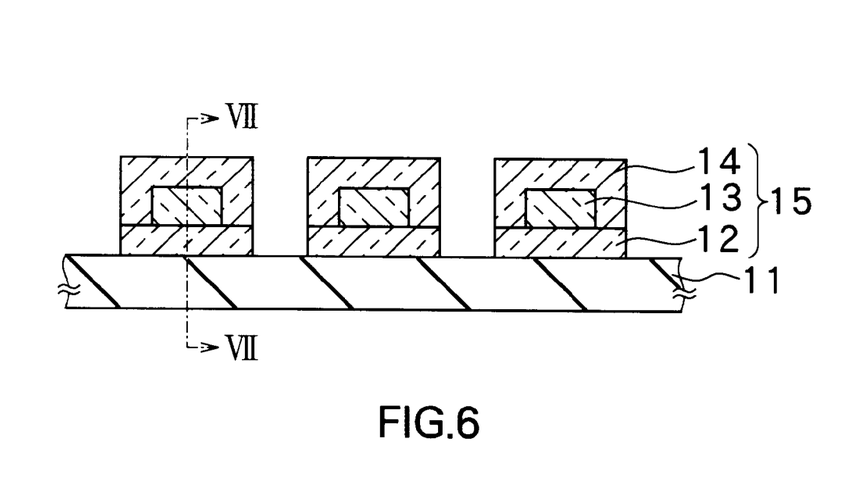
FIG. 6 is a cross sectional view of the process following the process of FIG. 5.

First, the optical waveguide 15 including the core 13 and the claddings 12 and 14 is formed on the substrate 11 by processes shown in FIGS. 4 to 6. FIGS. 4 to 6 show the cross section taken along the direction perpendicular to the direction of light propagation.

Specifically, as shown in FIG. 4, a lower cladding layer 12p made of an organic material and having a thickness of about tens of micrometers is formed on the flat substrate 11 such as a silicon substrate or a glass substrate by spin coating, for instance. Furthermore, the lower cladding layer 12p is cured by heat treatment, exposure to ultraviolet light, or the like. For example, acrylic resin such as polyimide or PMMA (polymethyl methacrylate), epoxy resin whose base resin is bisphenol or the like, polyolefine resin such as polyethylene or polystyrene, or any of these substances doped with fluorine can be used as the lower cladding layer 12p.

Then, a core layer 13p having the refractive index higher than the refractive index of the lower cladding layer 12p and a thickness of about tens of micrometers is formed on the lower cladding layer 12p by the process of spin coating, the process of heat treatment and so on. The material having the refractive index sufficiently higher than the refractive index of the material selected as the lower cladding layer 12p is selected as the core layer 13p among, for example, the above-described materials (the acrylic resin such as polyimide or PMMA, the epoxy resin whose base resin is bisphenol or the like, the polyolefine resin such as polyethylene or polystyrene, and any of these substances doped with fluorine).

Then, as shown in FIG. 5, the core layer 13p is patterned by a photolithography process, a reactive ion etching (RIE) process and so on, whereby the core 13 having a rectangular section is formed. In this case, the width of the core 13 is about 30 μm, for example.

Figure 7:
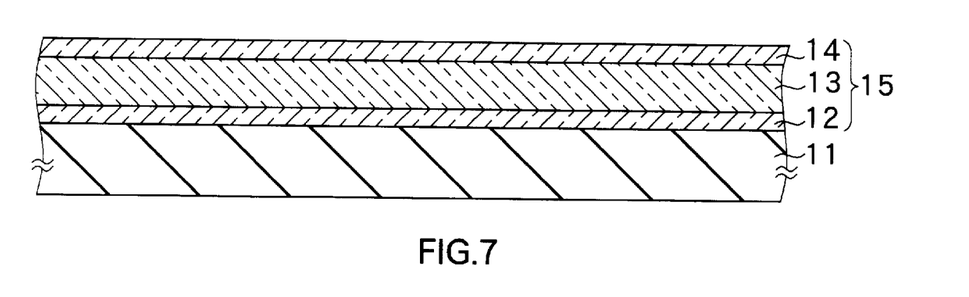
FIG. 7 is a cross sectional view of another sectional structure of an optical waveguide in the process shown in FIG. 6.

Then, as shown in FIGS. 6 and 7, an upper cladding layer made of the same material as that of the lower cladding layer 12p is formed over the whole surface of the substrate 11 with a thickness of about a few micrometers by the process of spin coating, the process of heat treatment and so on. Then, the upper cladding layer and the lower cladding layer 12p are selectively etched, whereby the optical waveguides are separated from one another. Thus, a plurality of separate optical waveguides 15, each of which has the core 13 surrounded by the claddings 12 and 14, are formed on the substrate 11. FIG. 7 is a cross sectional view taken along line VII—VII of FIG. 6, showing the optical waveguide 15 in a state shown in FIG. 6.

Figure 8:
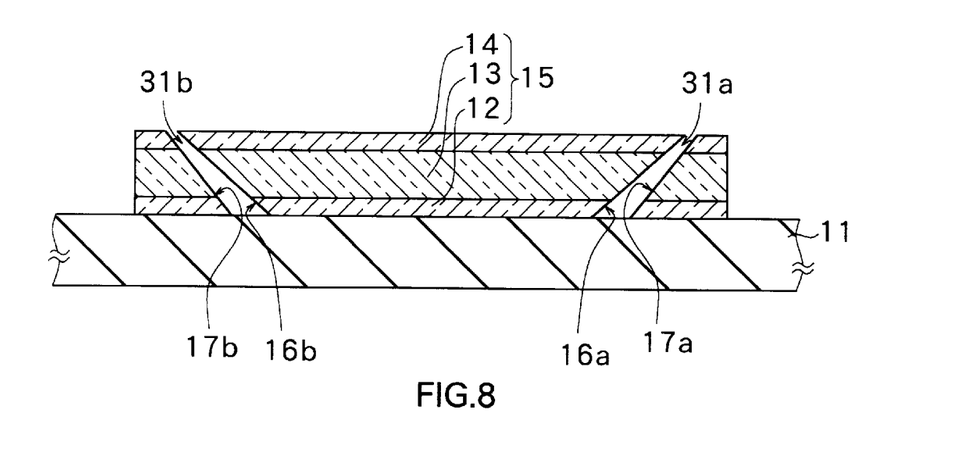
FIG. 8 is a cross sectional view of the process following the process of FIG. 7.
Figure 9:
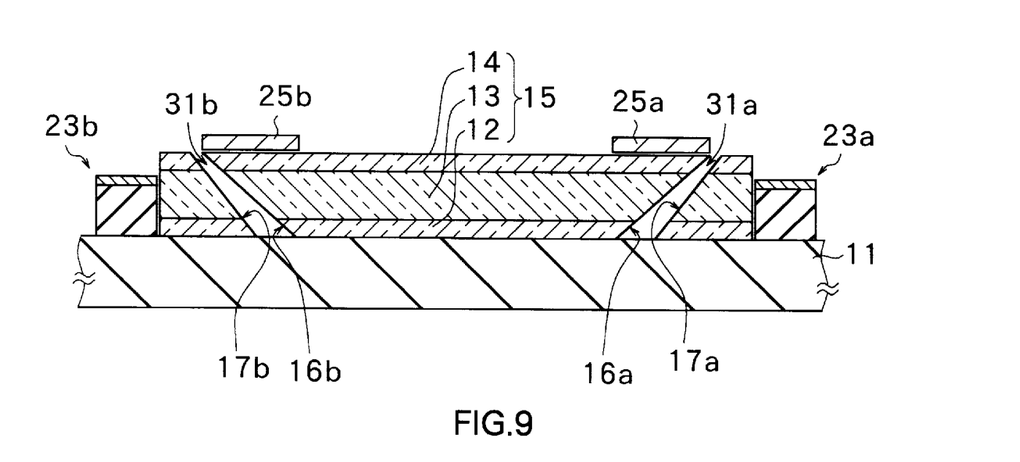
FIG. 9 is a cross sectional view of the process following the process of FIG. 8.

Then, as shown in FIG. 8, the trench-shaped spaces 31a and 31b and the ends 18a and 18b are formed. Furthermore, as shown in FIG. 9, the light emitting device 23a and the photodetector 25a are formed. FIGS. 8 and 9 show the cross section taken along the same direction as the direction shown in FIG. 7, i.e., the cross section of the optical waveguide 15 taken along the direction of light propagation.

The trench-shaped spaces 31a and 31b are formed by various etching processes such as laser processing using a high-power light beam such as an excimer laser, ion beam etching or powder beam etching. The powder beam etching means the etching using a beam of particulate powders. These processes take place, for example, from above the optical waveguide 15 by using a mask as needed. In this case, the diameter, direction, intensity and diffusing power of the beam and so on are controlled so that the angles θ1 and θ2 of the boundary surfaces 16a and 17a of the trench-shaped space 31a to the direction of light propagation may satisfy the above expressions (1) and (2). The angles θ1 and θ2 of boundary surfaces 16b and 17b of the trench-shaped space 31b are controlled in the same manner.

The ends 18a and 18b can be formed by various etching processes such as the laser processing, the ion beam etching or the powder beam etching in the same manner as described above. In this case, the trench-shaped spaces 31a and 31b may be processed simultaneously with the ends 18a and 18b or may be formed in a different step from the step of forming the ends 18a and 18b.

Then, as shown in FIG. 9, the edge emitting type light emitting devices 23a and 23b previously made are arranged on the substrate 11 near the ends 18a and 18b of the optical waveguide 15, respectively, so that the planes of exit of the light emitting devices 23a and 23b may face the ends 18a and 18b, respectively. The light emitting devices 23a and 23b are then fixed on the substrate 11 by an adhesive or the like. Furthermore, the surface photo-detection type photodetectors 25a and 25b previously made are arranged on the upper surface of the optical waveguide 15 at the positions corresponding to the positions at which the boundary surfaces 16a and 16b are formed, in such a manner that the planes of photo-detection of the photodetectors 25a and 25b are directed downward. The photodetectors 25a and 25b are then fixed on the optical waveguide 15 by the adhesive or the like.

Then, the light emitting devices 23a and 23b and the photodetectors 25a and 25b are connected to an electronic circuit not shown by wire bonding or the like, for example. Thus, the manufacturing of the principal part of the optical transmitting and receiving device according to this embodiment is completed.

As described above, according to the method of manufacturing the optical transmitting and receiving device according to this embodiment, after the optical waveguide 15 is formed, the etching process having directivity such as the laser processing takes place from above the optical waveguide 15, whereby the trench-shaped space 31a is formed so that the boundary surfaces 16a and 17a for switching the transmitted and coming lights are formed. Thus, many processes are not required. Therefore, the optical transmitting and receiving device capable of bidirectional optical transmission can be formed by a relatively small number of simple processes.

[Second embodiment]

Next, a second embodiment of the invention will be described.

Figure 10:
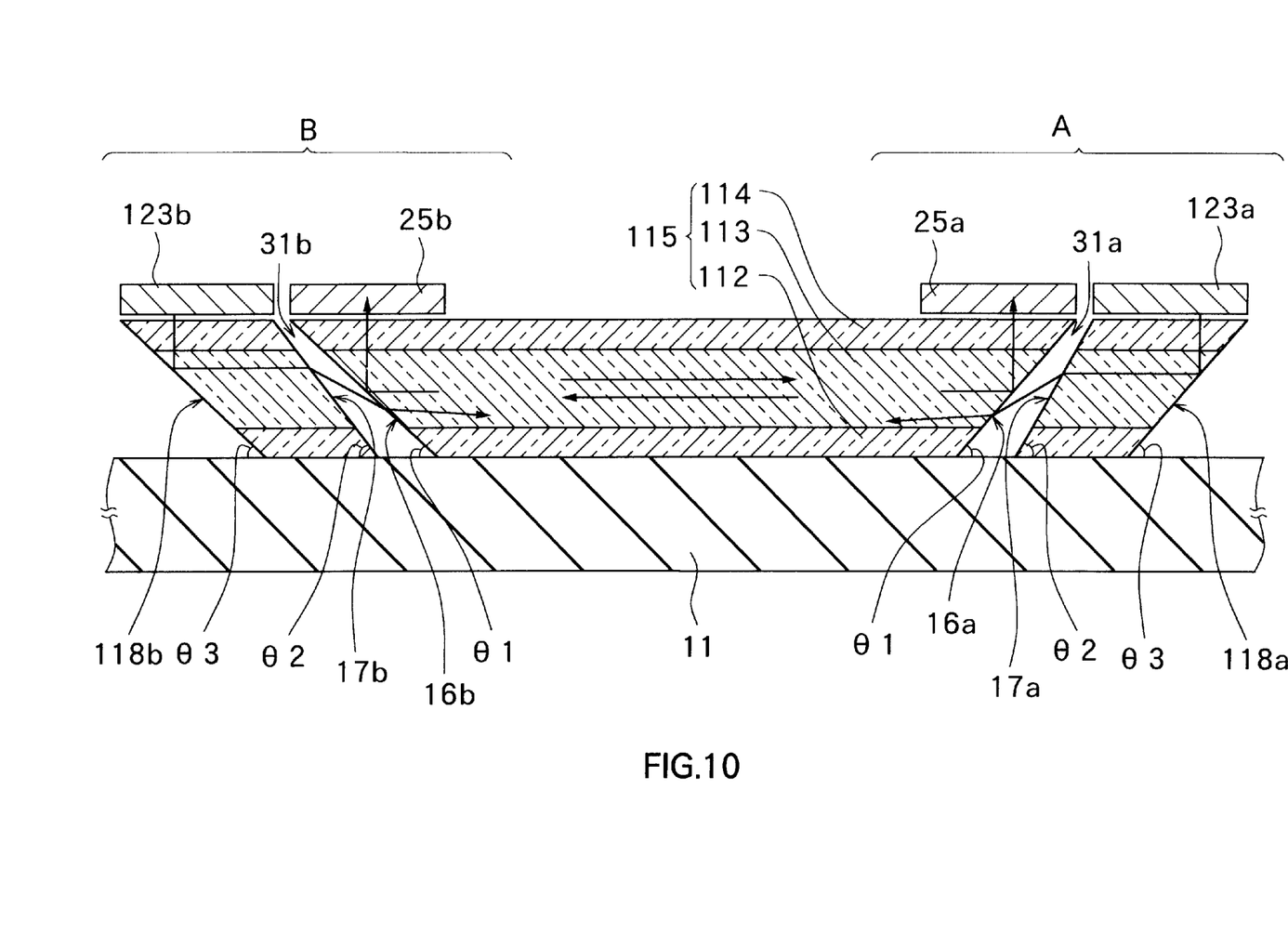
FIG. 10 is a cross sectional view of the optical transmitting and receiving device according to a second embodiment of the invention, showing the sectional structure taken along the direction of light propagation.

FIG. 10 shows a sectional structure of the optical transmitting and receiving device according to the second embodiment of the invention and corresponds to FIG. 1 showing the above-described first embodiment. In FIG. 10, the same elements as the elements shown in FIG. 1 are indicated by the same reference numerals, and the description is appropriately omitted.

In this embodiment, the edge emitting type light emitting devices are replaced as the light emitting device by surface emitting type light emitting devices 123a and 123b. The light emitting device such as VCSEL (Vertical Cavity Surface Emission Laser), for example, can be used as the light emitting devices 123a and 123b.

In this embodiment, each of the light emitting devices 123a and 123b is arranged not on the substrate 11 as in the case of the above-mentioned first embodiment but on an optical waveguide 115 near each of the ends thereof in such a manner that the planes of exit of the light emitting devices 123a and 123b are directed downward. Moreover, an angle θ3 of an end 118a of the optical wave guide 115 to the direction of light propagation is such an angle that the transmitting light exiting downward from the light emitting device 123a and entering into the optical waveguide 115 is totally reflected by the end 118a, differently from the above-described first embodiment. Specifically, the angle θ3 is set in accordance with Snell's law so as to satisfy the following expression (3).

$$\theta 3 > \sin^{-1}(1/n) \quad (3)$$

In this embodiment, the transmitting light exiting downward from the light emitting device 123a and entering into the optical waveguide 115 is totally reflected by the end 118a. Then, the transmitting light travels through the optical waveguide 115 in the longitudinal direction of the optical waveguide 115. Then, the transmitting light passes through the boundary surface 17a and travels into the trench-shaped space 31a. The process of propagation of the transmitting light thereafter and the process of reception of the coming light from the B side are the same as those of the above-described first embodiment, and thus the description is omitted.

As described above, according to the optical transmitting and receiving device of this embodiment, a surface emitting type device is used for not only the photodetector but also the light emitting device, thereby allowing a bidirectional optical transmission and reception.

Figure 11:
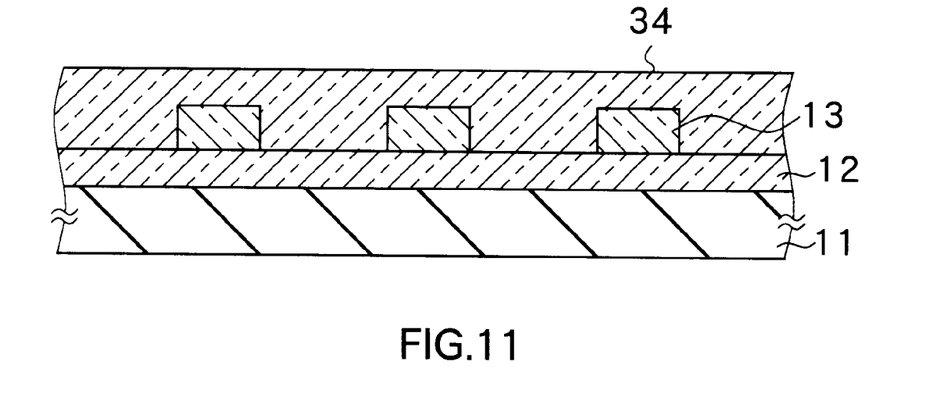
FIG. 11 is a cross sectional view of the optical transmitting and receiving device according to a modification of the embodiments of the invention, showing the sectional structure taken along the direction perpendicular to the direction of light propagation.

Although the invention has been described above by referring to some embodiments, the invention is not limited to these embodiments and various modifications of the invention are possible. For example, it has been described in the above embodiments that the optical waveguides 15 and 115 take the form of the separate optical waveguides, but the optical waveguides may take another form, that is, the optical waveguides are not separated from one another as shown in FIG. 11, for example. FIG. 11 shows the cross section taken along the direction perpendicular to the direction in which the light propagates through the optical waveguide. FIG. 11 corresponds to FIG. 6 showing the above-described embodiment. In the modification shown in FIG. 11, the core 13 is completely buried in the cladding comprising the cladding layers 12 and 34. The modification is the same as the above-described embodiments in that the trench-shaped space (not shown) is formed near the end of the optical waveguide so that the trench-shaped space may cross the cladding layer 34, the core 13 and the cladding layer 12 in this order.

Moreover, it has been described in the above embodiments that the trench-shaped spaces 31a and 31b are formed on the transmitting and receiving ends of the optical waveguide, i.e., the A and B sides, respectively. However, the trench-shaped space 31a according to the embodiments of the invention may be formed on one side alone, and a transmitting and receiving mechanism having any other constitution may be formed on the other side.

Moreover, it has been described in the above embodiments that the trench-shaped space 31a is filled with an external atmospheric medium (the air or the like), but the invention is not limited to this example. The trench-shaped space 31a may be filled with any other medium as long as the medium has the refractive index lower than the refractive index of the core 13. In this case, an inert medium, for example, is used as any other medium, whereby a change over time in reflection performance and transmission performance of the boundary surfaces 16a and 17a and the boundary surfaces 16b and 17b can be also prevented.

As described above, according to an optical waveguide device, an optical transmitting and receiving device, a method of manufacturing an optical waveguide device or a method of manufacturing an optical transmitting and receiving device of the invention, the trench-shaped space capable of switching the light propagating through the optical waveguide is formed in the optical waveguide near at least one end of the optical waveguide formed on the substrate and enabling the light to bidirectionally propagate through the optical waveguide so that the trench-shaped space may cross the direction of light propagation. Thus, the light propagating through the optical waveguide can be guided to routes differing in accordance with the direction of propagation of the light. Therefore, the optical signal can be bidirectionally transmitted and received by using a single optical waveguide. As a result, the effect of being able to easily achieve the increase in the density of the optical transmission using the optical waveguide is achieved.

More particularly, according to the optical waveguide device, the optical transmitting and receiving device, the method of manufacturing an optical waveguide device or the method of manufacturing an optical transmitting and receiving device, the trench-shaped space has the first boundary surface and the second boundary surface having predetermined functions. Thus, the following effect is achieved. By a relatively simple structure, the coming light propagating through the optical waveguide can be guided outward, and the transmitting light traveling in the direction opposite to the direction of the coming light can be guided into the optical waveguide.

Furthermore, according to the optical waveguide device, the optical transmitting and receiving device, the method of manufacturing an optical waveguide device or the method of manufacturing an optical transmitting and receiving device, the angle θ1 of the first boundary surface to the direction of light propagation is set so that the incident angle of the coming light incident on the first boundary surface is equal to or more than the critical angle, and the angle θ2 of the second boundary surface to the direction of light propagation is set so that the incident angle of the transmitting light incident on the second boundary surface does not exceed the critical angle. The effect of efficiently and surely switching the light is therefore achieved.

Moreover, according to the optical waveguide device, the optical transmitting and receiving device, the method of manufacturing an optical waveguide device or the method of manufacturing an optical transmitting and receiving device, at least one end of the optical waveguide forms an end which is substantially perpendicular to the direction of light propagation and which is capable of passing therethrough the externally incoming transmitting light in substantially the same direction as the incoming direction. The following effect is therefore achieved. A light source for the transmitting light can be arranged along the direction of light propagation (the longitudinal direction) of the optical waveguide.

Moreover, according to the optical waveguide device, the optical transmitting and receiving device, the method of manufacturing an optical waveguide device or the method of manufacturing an optical transmitting and receiving device, at least one end of the optical waveguide forms an end which forms a predetermined angle with the direction of light propagation so as to cross the direction of light propagation and which is capable of internally reflecting the transmitting light entering through the upper surface or the side surface of the optical waveguide. The following effect is therefore achieved. The light source for the transmitting light can be located on the upper surface or the side surface of the optical waveguide.

More particularly, according to the optical waveguide device, the optical transmitting and receiving device, the method of manufacturing an optical waveguide device or the method of manufacturing an optical transmitting and receiving device, the incident angle of the transmitting light incident on the end through the upper or side surface of the optical waveguide is equal to or more than the critical angle. Thus, internal reflection on the end assumes into total reflection. The effect of being able to improve an efficiency of transmission is therefore achieved.

Moreover, according to the method of manufacturing an optical waveguide device or the method of manufacturing an optical transmitting and receiving device, the optical waveguide enabling the light to bidirectionally propagate therethrough is formed on the substrate, and the trench-shaped space having the first and second boundary surfaces is formed in the optical waveguide near at least one end of the optical waveguide so as to cross the direction of light propagation. The first boundary surface can internally reflect the coming light propagating through the optical waveguide and thereby allow the exit of the coming light through the side surface of the optical waveguide. The second boundary surface can pass therethrough the transmitting light traveling in the direction opposite to the direction of propagation of the coming light and thereby guide the transmitting light into the optical waveguide through the first boundary surface. Thus, the following effect is achieved. Many processes are not required, and therefore the optical waveguide device or the optical transmitting and receiving device capable of the bidirectional optical transmission can be manufactured by a relatively small number of simple processes.

Obviously many modifications and variations of the present invention are possible in the light of the above teachings. It is therefore to be understood that within the scope of the appended claims the invention may be practiced otherwise than as specifically described.

What is claimed is:

1. An optical waveguide device comprising:
    an optical waveguide formed on a substrate and enabling a light to bidirectionally propagate therethrough; and
    a trench-shaped space formed in the optical waveguide near at least one end of the optical waveguide to cross a direction of light propagation, the trench-shaped space being capable of switching the light propagating through the optical waveguide,
    wherein the trench-shaped space has a first boundary surface capable of internally reflecting a coming light propagating through the optical waveguide, thereby guiding the coming light out of the optical waveguide, and a second boundary surface capable of passing therethrough a transmitting light traveling in the direction opposite to the direction of propagation of the coming light, thereby guiding the transmitting light into the optical waveguide,
    wherein when n denotes a refractive index of a material constituting a principal part of the optical waveguide, an angle $\theta_1(°)$ of the first boundary surface to the direction of light propagation and an angle $\theta_2(°)$ of the second boundary surface to the direction of light propagation satisfy the following expressions:

$\theta_1 < 90 - \sin^{-1}(1/n)$ $\theta_2 > 90 - \sin^{-1}(1/n)$.

2. An optical waveguide device according to claim 1, wherein the optical waveguide includes:
    a core which the light propagates through; and
    a cladding formed to surround the core.

3. An optical waveguide device according to claim 2, wherein the trench-shaped space is formed to cross at least the core.

4. An optical waveguide device according to claim 1, wherein at least one end of the optical waveguide forms an end surface which is substantially perpendicular to the direction of light propagation and which is capable of passing therethrough the externally incoming transmitting light in substantially the same direction as the incoming direction, and
    the transmitting light entering through the end surface passes the second boundary surface, the trench-shaped space, and the first boundary surface in sequence so that the transmitting light is guided into the optical waveguide.

5. An optical waveguide device according to claim 1, wherein at least one end surface of the optical waveguide forms an end surface which forms a predetermined angle with the direction of light propagation to cross the direction of light propagation and which is capable of internally reflecting the transmitting light entering through an upper surface or a side surface of the optical waveguide, and
    the transmitting light reflected by the end surface passes the second boundary surface, the trench-shaped space, and the first boundary surface in sequence so that the transmitting light is guided into the optical waveguide.

6. An optical waveguide device according to claim 5, wherein when n denotes the refractive index of the material constituting the principal part of the optical waveguide,
    an angle $\theta_3(°)$ of the end surface to the direction of light propagation satisfies the following expression:

$\theta_3 > \sin^{-1}(1/n)$.

7. An optical waveguide device according to claim 1, wherein the optical waveguide comprises a high polymeric material.

8. An optical waveguide device according to claim 1, wherein the substrate comprises an inorganic material containing at least one of silicon, quartz, glass and ceramics or an organic material.

9. An optical transmitting and receiving device comprising:
    an optical waveguide formed on a substrate and enabling a light to bidirectionally propagate therethrough;
    a trench-shaped space formed in the optical waveguide near at least one end of the optical waveguide to cross the direction of light propagation, the trench-shaped space being capable of switching the light propagating through the optical waveguide;
    a photodetector for receiving a coming light switched by the trench-shaped space; and
    a light emitting device for emitting a transmitting light toward the trench-shaped space,
    wherein the trench-shaped space has a first boundary surface capable of internally reflecting the coming light propagating through the optical waveguide, thereby guiding the coming light out of the optical waveguide, and a second boundary surface capable of passing therethrough the transmitting light traveling in the direction opposite to the direction of propagation of the coming light, thereby guiding the transmitting light into the optical waveguide,
    wherein when n denotes a refractive index of a material constituting a principal part of the optical waveguide, an angle $\theta_1(°)$ of the first boundary surface to the direction of light propagation and an angle $\theta_2(°)$ of the second boundary surface to the direction of light propagation satisfy the following expressions:

$\theta_1 < 90 - \sin^{-1}(1/n)$ $\theta_2 > 90 - \sin^{-1}(1/n)$.

10. An optical transmitting and receiving device according to claim 9, wherein the optical waveguide includes:
    a core which the light propagates through; and
    a cladding formed to surround the core.

11. An optical transmitting and receiving device according to claim 9, wherein the trench-shaped space is formed to cross at least the core.

12. An optical transmitting and receiving device according to claim 9, wherein the photodetector is arranged on the upper surface or the side surface of the optical waveguide near the first boundary surface, and the photodetector can receive the coming light reflected by the first boundary surface.

13. An optical transmitting and receiving device according to claim 9, wherein at least one end of the optical waveguide forms an end surface which is substantially perpendicular to the direction of light propagation and which is capable of passing therethrough the externally incoming transmitting light in substantially the same direction as the incoming direction, and the transmitting light entering through the end surface passes the second boundary surface, the trench-shaped space, and the first boundary surface in sequence so that the transmitting light is guided into the optical waveguide.

14. An optical transmitting and receiving device according to claim 13, wherein the light emitting device is arranged to face the end surface and emits the transmitting light toward the end surface.

15. An optical transmitting and receiving device according to claim 14, wherein the light emitting device has a light emitting layer having an end surface which the light exits through.

16. An optical transmitting and receiving device according to claim 9, wherein at least one end of the optical waveguide forms an end surface which forms a predetermined angle with the direction of light propagation to cross the direction of light propagation and which is capable of internally reflecting the transmitting light entering through the upper surface or the side surface of the optical waveguide, and the transmitting light reflected by the end surface passes the second boundary surface, the trench-shaped space, and the first boundary surface in sequence so that the transmitting light is guided into the optical waveguide.

17. An optical transmitting and receiving device according to claim 16, wherein the light emitting device is arranged on the upper surface or the side surface of the optical waveguide.

18. An optical transmitting and receiving device according to claim 16, wherein the light emitting device has a light emitting layer having a main surface which the light exits through.

19. An optical transmitting and receiving device according to claim 16, wherein when n denotes the refractive index of the material constituting the principal part of the optical waveguide, an angle $\theta 3(°)$ of the end surface to the direction of light propagation satisfies the following expression:

$$\theta 3 > \sin^{-1}(1/n).$$

20. A method of manufacturing an optical waveguide device comprising the steps of:

forming on a substrate an optical waveguide enabling a light to bidirectionally propagate therethrough; and forming a trench-shaped space in the optical waveguide near at least one end of the optical waveguide to cross the direction of light propagation, the trench-shaped space having a first boundary surface and a second boundary surface, the first boundary surface being capable of internally reflecting a coming light propagating through the optical waveguide and thereby guiding outward the coming light through the upper surface or the side surface of the optical waveguide, the second boundary surface being capable of passing therethrough a transmitting light traveling in the direction opposite to the direction of propagation of the coming light and thereby guiding the transmitting light into the optical waveguide through the first boundary surface, wherein when n denotes a refractive index of a material constituting a principal part of the optical waveguide, an angle $\theta 1(°)$ of the first boundary surface to the direction of light propagation and an angle $\theta 2(°)$ of the second boundary surface to the direction of light propagation satisfy the following expressions:

$$\theta 1 < 90 - \sin^{-1}(1/n)$$

$$\theta 2 > 90 - \sin^{-1}(1/n).$$

21. A method of manufacturing an optical waveguide device according to claim 20, wherein at least one end of the optical waveguide forms an end surface which is substantially perpendicular to the direction of light propagation and which is capable of passing therethrough the externally incoming transmitting light and thereby guiding the transmitting light toward the second boundary surface.

22. A method of manufacturing an optical waveguide device according to claim 20, wherein at least one end of the optical waveguide forms an end surface which forms a predetermined angle with the direction of light propagation to cross the direction of light propagation and which is capable of internally reflecting the transmitting light entering through the upper surface or the side surface of the optical waveguide and thereby guiding the transmitting light toward the second boundary surface.

23. A method of manufacturing an optical waveguide device according to claim 22, wherein when n denotes the refractive index of the material constituting the principal part of the optical waveguide, an angle $\theta 3(°)$ of the end surface to the direction of light propagation satisfies the following expression:

$$\theta 3 > \sin^{-1}(1/n).$$

24. A method of manufacturing an optical transmitting and receiving device comprising the steps of:

forming on a substrate, an optical waveguide enabling a light to bidirectionally propagate therethrough;

forming a trench-shaped space in the optical waveguide near at least one end of the optical waveguide to cross the direction of light propagation, the trench-shaped space having a first boundary surface and a second boundary surface, the first boundary surface being capable of internally reflecting a coming light propagating through the optical waveguide and thereby guiding outward the coming light through the upper surface or the side surface of the optical waveguide, the second boundary surface being capable of passing therethrough a transmitting light traveling in the direction opposite to the direction of propagation of the coming light and thereby guiding the transmitting light to the optical waveguide through the first boundary surface;

forming a photodetector for receiving the coming light reflected by the first boundary surface, on the upper surface or the side surface of the optical waveguide near the first boundary surface; and forming near the end surface a light emitting device for emitting the transmitting light toward the end surface, wherein when n denotes a refractive index of a material constituting a principal part of the optical waveguide, an angle θ1(°) of the first boundary surface to the direction of light propagation and an angle θ2(°) of the second boundary surface to the direction of light propagation satisfy the following expressions:

$$\theta 1 < 90 - \sin^{-1}(1/n)$$

$$\theta 2 > 90 - \sin^{-1}(1/n).$$

25. A method of manufacturing an optical transmitting and receiving device according to claim 24, wherein at least one end of the optical waveguide forms an end surface which is substantially perpendicular to the direction of light propagation and which is capable of passing therethrough the externally incoming transmitting light in substantially the same direction as the incoming direction.

26. A method of manufacturing an optical transmitting and receiving device according to claim 24, wherein at least one end of the optical waveguide forms an end surface which forms a predetermined angle with the direction of light propagation to cross the direction of light propagation and which is capable of internally reflecting the transmitting light entering through the upper surface or the side surface of the optical waveguide.

27. A method of manufacturing an optical transmitting and receiving device according to claim 26, wherein when n denotes the refractive index of the material constituting the principal part of the optical waveguide, an angle θ3(°) of the end surface to the direction of light propagation satisfies the following expression:

$$\theta 3 > \sin^{-1}(1/n).$$

* * * * *